Feb. 19, 1963 J. H. WRIGHT 3,077,788
DEVICE FOR TRANSMISSION OF CURVILINEAR MOTION IN ONE
PLANE TO RECTILINEAR MOTION IN THE SAME PLANE
Filed Aug. 10, 1959
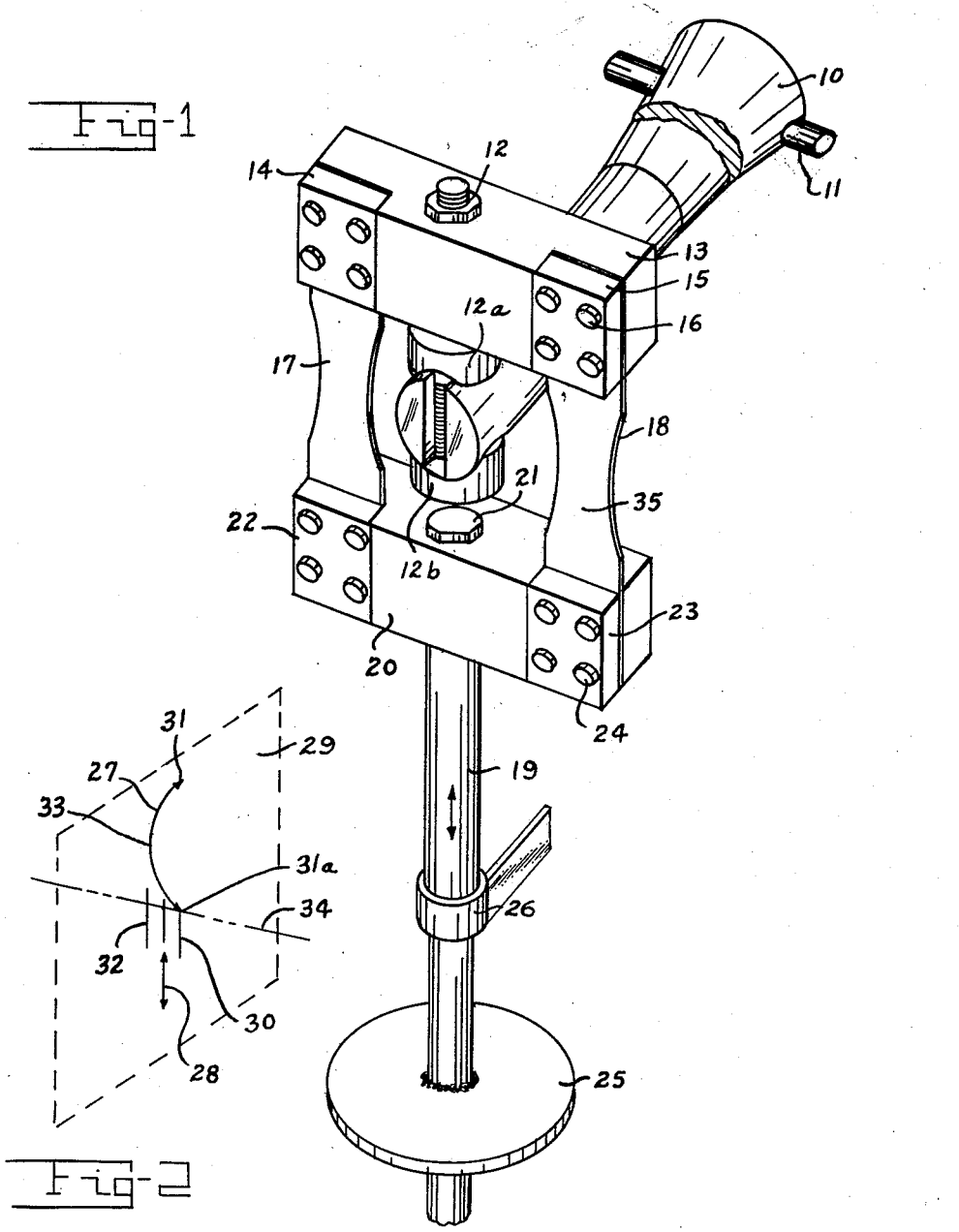
INVENTOR.
JOHN H. WRIGHT
BY
Norman R Wissinger
ATTORNEY United States Patent Office 3,077,788
Patented Feb. 19, 1963

3,077,788
DEVICE FOR TRANSMISSION OF CURVILINEAR MOTION IN ONE PLANE TO RECTILINEAR MOTION IN THE SAME PLANE
John H. Wright, Dayton, Ohio, assignor to Monsanto Chemical Company, St. Louis, Mo., a corporation of Delaware
Filed Aug. 10, 1959, Ser. No. 832,804
7 Claims. (Cl. 74—108)

The present invention relates to a device for the transmission of oscillating curvilinear motion to coplanar reciprocating rectilinear motion and particularly to such a device for use in vibrating disc agitators.

In such agitating devices and in other mechanisms wherein a reciprocating shaft is actuated by a walking beam or rocker arm which moves about a pivotal support spaced from the point at which such arm is connected to the shaft, the kinematic result is that the curvilinear movement of the point on such arm to which the shaft is affixed will cause the shaft to swing at least nominally back and forth as well as up and down. The complexity of this multi-directional movement of the shaft is such that it is difficult to accommodate by bearings, guides or other stationary members with which the shaft may be associated. Moreover, it is quite often the case that, even if such multi-directional shaft motion can be satisfactorily accommodated, it is undesirable from the standpoint of the ultimate purpose for which the mechanism is designed. This is true in the case of vibrating agitators of the type considered in the present invention in that any departure of the vibrating shaft from purely rectilinear movement results in vector losses of the agitating force. Stated otherwise, it might be said that all movements of the shaft other than in a purely rectilinear path do not contribute to the ultimately desired agitation; and, so much of the force of the driving machinery as is required to produce this non-rectilinear motion is therefore non-productive and lessens the efficiency of the apparatus.

To circumvent the above difficulties, the prior art has resorted to a variety of expedients in the form of complicated and cumbersome combinations of crossheads, parallelogram linkages and the like. While these measures have achieved, at least in theory, the desired translation of a curvilinear to a co-planar rectilinear motion, they have had many practical disadvantages included among which are the increased load upon the prime mover resulting from the friction of the increased number of moving parts, the "play" or "back-lash" introduced by and inherent in the cumulative effect of the clearances and tolerances required for the movement of these various parts relative to each other, and the expense of design, construction and maintenance of such assemblies. In certain cases where the amplitude of the oscillatory movement has been extremely small relative to the overall movement and/or dimensions of the moving parts, the prior art has simply confined the vibrating shaft by suitable bearings and guide sleeves to the extent that, at least in the "working area" the shaft can move in nothing but a reciprocating rectilinear pattern. In such cases however, the force required to overcome the restraining influences of these guiding members has at least equaled and in most cases has exceeded that which would have been lost in the uncontrolled multi-directional movement of the shaft. This restriction of lateral movement of the shaft has also required that the oscillatory motion be compensated for by a flexing or twisting of the parts of the machinery between the point of connection to the oscillating body and the point of confinement for the rectilinear movement; and the strains resulting from this have seriously shortened the useful life of these components.

It is accordingly an object of the present invention to provide improved means for transmitting oscillating curvilinear motion to co-planar reciprocating rectilinear motion.

It is a further object of the present invention to provide such means which will be convenient and economical to design, construct and maintain, will require only a minimum of lost motion and will not represent any increase in the load upon the prime mover.

It is still a further object of the present invention to provide such means which will eliminate any "play" or "back-lash" in the system and will eliminate any deteriorating lateral forces acting upon such bearings and sleeves as are used to mount the vibrating shaft for slidable, rectilinear movement.

It is a further object of the present invention to provide such means which will relieve rather than augment any straining of the moving parts.

It is a more specific object of the present invention to provide an improved means having the foregoing advantages for use in a vibrating disc agitator.

To achieve these and other objects and advantages which will be apparent from a reading of the following disclosure, the present invention provides a flexure member as the sole connecting link between the oscillatingly driven drive arm or rocker arm and the rectilinearly moving vibrating shaft. This flexure member is in the form of one or more flat, resilient columns arranged in a plane which is perpendicular to the primary plane of the curvilinear and rectilinear motion and associated with the rocker arm and vibrating shaft by clamping means carried by these respective components and holding the flexure members at their extremities.

In vibrating disc agitators and in most other applications wherein the present invention will find utility, the flexure members should be so oriented that the movement of their bending will be in planes which are coextensive with or parallel to the primary plane of the motion of the rocker arm and vibrating shaft. To respond with such movement under the influence of the oscillating drive arm, the spring-like column members should be relatively thin in the direction parallel to the plane of motion of said members as compared to their width in the direction at right angles to such plane. While this desired thickness-to-width ratio is maintained, the column members may be provided with whatever cross sectional material is necessary to support the loads upon and created by the general apparatus without impairing the flexibility of the members in the desired direction parallel to the primary plane of movement of the arm and shaft.

As a refinement of this invention it is preferred though not necessary that the bending characteristics of the flexure member and the relative positions of the shaft and the point on the oscillating drive arm to which the shaft is connected be such that, during the complete cycle of movement of the drive arm, the flexure member will undergo reverse bending; i.e., will bend first in one direction and then in the opposite direction. To achieve this, the connection of the flexure member to the oscillating drive arm should be at a point so located that an imaginary extension of the pre-determined rectilinear path of the vibrating shaft will be mid-way between and parallel to a pair of spaced lines, one of which is tangent to the path of curvilinear motion and the other of which passes through the extremities of such curved path. The spring members thus oriented will, as a result of their reverse bending, actually be displaced from their normal or "at rest" position only one-half of the distance which would be required to accommodate a given arc of motion if the bending were to take place only in one direction. This smaller displacement will then result in less bending stress and has been found to render substantial improvement in the fatigue life of the flexure member.

A further refinement of the present invention involves the "necking" or reduction in width of the flexure members toward the center thereof; i.e., at the portion removed from the extremities at which such members are clamped, so as to prevent any concentration of bending at the points where bending is restrained by the clamps.

The invention thus generally described may be more clearly understood by reference to the following detailed description of a preferred embodiment thereof in connection with which reference may be had to the appended drawings.

In the drawings:

FIGURE 1 is a perspective view of a part of a vibrating disc agitator embodying the features of this invention.

FIGURE 2 is a diagrammatic illustration of the movements contemplated in the device of FIGURE 1.

Referring now to FIGURE 1, the present invention is shown to be adapted for use in connection with a vibrating disc agitator which comprises the reciprocatingly driven drive arm or rocker arm 10 which is pivotally mounted for oscillating movement about the pivot pin 11. Affixed to the forward end of the drive arm 10 by the threaded fastener 12 passing through the embracing blocks 12a and 12b is the cross member 13 the corner portions 14 and 15 of which on one side thereof are removably associated therewith by headed fastening members such as machine screws 16. The nature of these corner blocks 14 and 15 and the notches cut in the cross member 13 to accommodate the same are such that the blocks and the cross member present opposed broadside surfaces which may be urged together by the fasteners 16 to engage and clamp the upper extremities of the flexure members 17 and 18 to be described below. The flexure members 17 and 18 may be further provided with suitably located bores through which the headed fasteners may pass.

The flexure members are connected to the disc shaft 19 by means of a similar cross member 20 attached to the shaft by means of the headed fastener 21. Cooperating with the cross member 20 to clamp the lower extremities of the flexure members 17 and 18 are the corner blocks 22 and 23 which, together with the cross member 20 provide the opposed flat surfaces for clamping and holding the spring under the action of the headed fasteners 24.

To the lower portion of the disc shaft are affixed one or more suitable discs or blades such as 25 for immersion in a vat or reactor to agitate the contents thereof. The discs may be affixed to the shaft by welding as shown or by other mechanical means. To hold the shaft and to guide the same in its preferred rectilinear movement, suitable sleeves or bearing such as 26 may be provided within which the shaft is slidable. Such sleeves are immovably associated with the agitator assembly as by being welded or clamped to the agitator frame. Although the lateral movement of the disc shaft is thus restricted, the shaft is protected from the distorting influence of the arcuate movement of the drive arm by bending of the flexure members. At the same time the guides themselves are shielded from excessive lateral stresses, all to the enhancement of the operational life of both the shaft and its bearings.

In operation, the pivotally supported drive arm is actuated so that it will rock or oscillate about its fixed pivotal support. The forward end of the arm will thereby be caused to oscillate reciprocably back and forth in an arcuate path. Associated with this end of the arm by means of the flexure member assembly above described is the disc shaft 19 carrying the axially spaced discs 25. As a result of the oscillating movement of the drive arm end to which the shaft is affixed and of the influence upon such movement of the flexure member assembly, the disc shaft and the discs thereon will vibrate rapidly in an up-and-down motion. In its ultimate application, a disc shaft so driven is placed in a tank, vat or like receptacle so that the contents thereof will be violently and rapidly agitated by the resultant movement therein and therethrough of the discs.

Referring now to FIGURE 2, the curvilinear or arcuate motion of that point of the drive arm to which the clamping assembly consisting of the members 13, 14, 15 and 16 is attached is designated by the curved line 27. The reciprocating movement of the disc shaft is shown as the line 28. Where the components are oriented according to the teachings of this invention, the path 27 of the curvilinear motion will be co-planar with the path 28 of the rectilinear motion, and this plane 29 is referred to herein as the primary plane of motion.

As stated above, to achieve the maximum available life from the flexure members, the components are preferably arranged so that these members will bend equally in both directions through the complete cycle of the drive arm. This is accomplished by so locating that point on the drive arm to which the flexure members are associated relative to the path of motion of the disc shaft as indicated by the arrows that the path 28 of the shaft will be parallel to and equi-distant from an imaginary line such as 30 through the extremities 31 and 31a of the curvilinear path 27 and a line 32 which is tangent to the curve 27 at its apex or mid point 33.

To insure that the paths 27 and 28 will be co-planar in the actual operation of the apparatus, the flexure members should be so dimensioned and so positioned that they will most readily yield to bending forces by movement in a plane or planes which are parallel to the primary plane 29. Stated otherwise the bending of these flexure members will be about an axis or center of bending which is perpendicular to the primary plane, such an axis being represented diagrammatically as the line 34.

Where the preferred embodiment above described is for a vibrating disc reactor wherein the drive arm will oscillate with a frequency of approximately one-thousand vibrations per minute with an amplitude of approximately one-eighth of an inch and will be subjected by the driving mechanism or prime mover (not shown) and the load upon the agitating disc to a stress of approximately five thousand pounds per square inch and where the cross members 13 and 20 are approximately six inches apart, a suitable flexure member has been found to comprise two columns in the form of the spring sheets 17 and 18 composed of a stainless steel such as American Iron and Steel Institute Type 303 approximately two inches wide at the points where they are clamped to the cross members and one-eighth of an inch thick; i.e., in the direction of the bending. As shown in FIGURE 1 the width of the respective spring members is preferably but not necessarily reduced to provide a necked portion 35 at points spaced from the portions of the spring members which are held within the clamping assembly. In the embodiment described in this paragraph, the reduction in width begins at a point spaced one-fourth of an inch from the clamps at each end of the flexure members and progresses along an arc to a smallest width midway between the clamps of one and one-eighth inches. This width variation confines the flexure of the members 17 and 18 to an area spaced at both ends from the clamping members to avoid any concentration of bending at the points where the clamps rigidly hold the spring. In actual tests under the load and operating conditions above described, this mechanism has been found to operate through over ninety million cycles without any failure.

The flexure members may be composed of steel or other metal or of any other material which is sufficiently flexible and elastic to withstand the bending to which such members will be subjected and which has an endurance limit sufficiently high that it will not yield or fail when subjected to repetitive bending under the stresses to which it will be subjected in any particular application. The present invention requires that the flexure member or members be positioned between and from the sole connection linking the rocker arm and the disc shaft, but the precise location of any such member and the manner of its association with such arm or shaft may be varied according to conventional design practice. It is conceivable for example that a flexure member similar to those illustrated herein might be formed integrally with either the rocker arm or the reciprocating shaft as an extension thereof.

While this invention has been described in connection with certain preferred embodiments and examples thereof, it is to be understood that the foregoing particularization and detail have been for descriptive purposes only and variations are contemplated within the scope of this invention.

I claim:

1. A device for transmitting motion comprising a drive arm oscillatingly driven in a primary plane about a fixed pivotal support, a shaft mounted for reciprocal sliding movement relative to said arm and in said primary plane, and a flexure member in the form of one or more flat spring columns, the respective ends of which are associated with and are in fixed position relative to said arm and to said shaft wherein said spring columns have their broadside surfaces in a plane which is perpendicular to said primary plane and are most readily yieldable in a plane parallel to said primary plane.

2. A mechanical movement means comprising an oscillatingly driven drive arm, the forward end of which describes oscillating curvilinear motion in a primary plane, a shaft mounted for reciprocating slidable rectilinear movement in said plane and means for connecting said shaft to said arm comprising as a sole intercommunicating link, a flexure member comprising one or more resilient sheet columns, the broadside surfaces of which are perpendicular to said plane, said sheet columns being most readily yieldable to movement parallel to said plane.

3. A vibrating disc agitator comprising an oscillatingly driven drive arm, the forward end of which describes oscillating curvilinear motion in a primary plane, a disc shaft mounted for reciprocating slidable rectilinear movement in said primary plane and means for connecting said shaft to said arm comprising a flexure member as the sole intercommunicating link between said shaft and said arm comprising one or more steel sheets, the broadside surfaces of which are perpendicular to said plane, wherein said sheets are held at their opposite extremities between opposed broadside surfaces of clamping assemblies affixed to said arm and said shaft.

4. A mechanical movement means according to claim 3 wherein said sheets are necked in that dimension thereof which is perpendicular to said plane at a portion spaced from said clamping assemblies.

5. A mechanical movement means according to claim 4 wherein said shaft moves in a line, the imaginary extension of which intersects the curve described by that point on said arm to which the clamping assembly is affixed.

6. A mechanical movement means according to claim 5 wherein a line parallel to the path of the reciprocating motion of said shaft and tangent to the curvilinear path of the motion of that point on said arm to which said clamping assembly is affixed is parallel to an imaginary line through the extremities of said curvilinear path and wherein the imaginary extension of the path of the reciprocating movement of said shaft is mid-way between said lines.

7. A mechanical movement means according to claim 6 wherein said sheets bend always in two directions throughout the entire cycling of said arm.

References Cited in the file of this patent

UNITED STATES PATENTS

| | | |
|---|---|---|
| 1,567,334 | Schieferstein | Dec. 29, 1925 |
| 1,658,212 | Stevenson | Feb. 7, 1928 |
| 2,270,117 | Fill | Jan. 13, 1942 |
| 2,584,202 | Harp | Feb. 5, 1952 |
| 2,661,192 | Horsley et al. | Dec. 1, 1953 |
| 2,667,407 | Fenske et al. | Jan. 26, 1954 |
| 2,839,938 | Ahlgren et al. | June 24, 1958 |
| 2,882,748 | Parstorfer | Apr. 21, 1959 |
| 2,916,922 | Sorensen | Dec. 15, 1959 |

FOREIGN PATENTS

| | | |
|---|---|---|
| 88,255 | Netherlands | Apr. 17, 1958 |
| 335,534 | Switzerland | Feb. 28, 1959 |